United States Patent [19]

Brehm et al.

[11] Patent Number: 4,951,703
[45] Date of Patent: Aug. 28, 1990

[54] ELECTROMAGNETIC WAVE

[75] Inventors: Werner Brehm, Hemmingen; Horst Staib, Schwieberdingen, both of Fed. Rep. of Germany

[73] Assignee: Robert Bosch GmbH, Stuttgart, Fed. Rep. of Germany

[21] Appl. No.: 206,870

[22] Filed: Jun. 9, 1988

[30] Foreign Application Priority Data

Aug. 27, 1987 [DE] Fed. Rep. of Germany ....... 8711602

[51] Int. Cl.⁵ .................... F16K 43/00; F16K 31/06
[52] U.S. Cl. .................................. 137/315; 239/585; 251/129.14; 251/129.15; 251/129.16
[58] Field of Search ................ 251/129.15, 129.16, 251/129.14; 239/585; 137/625.25, 625.48, 625.65, 271

[56] References Cited

U.S. PATENT DOCUMENTS 3,757,263  9/1973  Saarem et al. ............... 251/129.15
4,005,733  2/1977  Riddel ........................... 251/129.16
4,474,332 10/1984  Kaska ............................ 251/129.16
4,515,129  5/1985  Stettner ......................... 251/129.15
4,540,154  9/1985  Kolchinsky et al. ........... 251/129.15
4,579,145  4/1986  Leiber et al. .................. 251/129.16
4,655,396  4/1987  Taxon et al. ................... 251/129.16
4,679,767  7/1987  Vollmer et al. ................ 251/129.15
4,755,331  7/1988  Stegmaier ...................... 251/129.15

*Primary Examiner*—George L. Walton
*Attorney, Agent, or Firm*—Michael J. Striker

[57] ABSTRACT

An electromagnetic valve includes a housing which accommodates an armature and a spool and separates them from the hydraulic valve part of the valve. The housing includes a tubular casing made by deep drawing or extrusion molding and flanged at two ends thereof to form two end flanges which extend inwardly of the housing to enclose parts positioned in the housing. A tubular sleeve which serves as a spacer abuts against the inner peripheral face of the casing.

2 Claims, 4 Drawing Sheets

ELECTROMAGNETIC WAVE

BACKGROUND OF THE INVENTION

The present invention relates to an electromagnetic valve.

Electromagnetic valves of the foregoing type are very efficient in function, simple in construction and economical in space so that they present no assembly and weight-related problems. Manufacture of such valves is not however optimal so that it is not sufficiently inexpensive as well as their storage.

SUMMARY OF THE INVENTION

It is an object of the present invention to provide an improved housing means for an electromagnetic valve.

It is another object of the invention to provide an efficiently functioning electromagnetic valve which is easy to manufacture and less expensive as compared to conventional electromagnetic valves of the same type.

These and other objects of the invention are attained by an electromagnetic valve comprising housing means, a spool and an armature accommodated in said housing means, and valve means, said housing means closing said spool and said armature from said valve means, said housing means including a cylindrical casing which is flanged at two ends thereof to form two end flanges which hold said spool and said armature in said housing means, said housing means further including a cylindrical sleeve lying against an inner side of said casing and serving as a spacing holder between parts enclosed in said housing means.

The two ends of said casing may be flanged inwardly, said flanges having edges which lie on said parts enclosed in said housing means.

The casing may be made of a tube or as a drawn part or a pressed part.

The sleeve may be tubular and have an elongated slot.

The objects of the invention are also attained by an electromagnetic valve, comprising housing means, a spool and an armature accommodated in said housing means, and valve means, said housing means closing said spool and said armature from said valve means, said housing means including a cylindrical casing which is flanged at two ends thereof to form two end flanges which hold said spool and said armature in said housing means, said casing having at least one stampedout opening for feeding a cable into said housing means and being formed with a shoulder for holding parts in said housing means.

The casing may be made by deep drawing or extrusion folding.

The casing may be cup-shaped and have an internal cylindrical extension, said spool being arranged around said extension.

One of the ends of said casing may be flanged before the valve is assembled.

The tubular external casing makes the manufacture and assembly of the electromagnetic valve particularly inexpensive.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
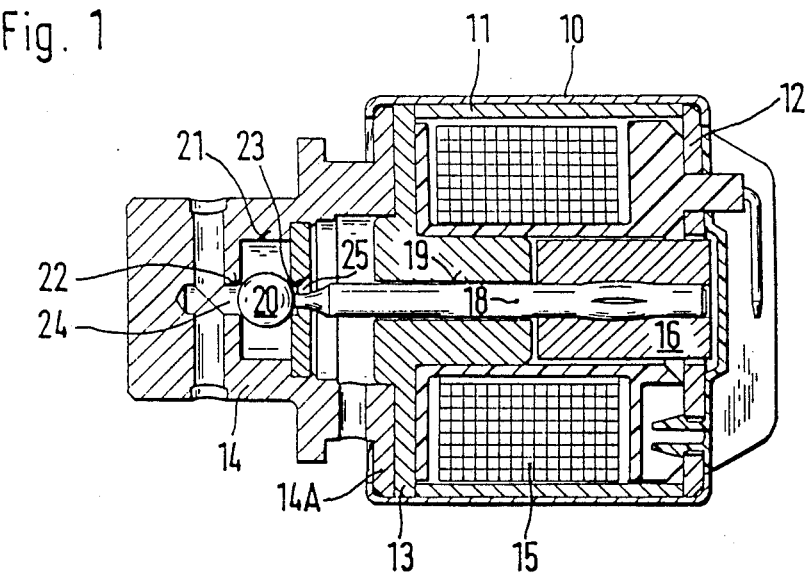
FIG. 1 is an axial sectional view of the electromagnetic valve of the first embodiment of the invention.

Referring now to the drawings in detail it will be seen that in the embodiment illustrated in FIG. 1, reference numeral 10 designates an external casing of the electromagnetic valve. External casing 10 is a cylindrical element of a relatively thin material, which is formed by pressing or drawing. A relatively thin cylindrical sleeve 11 is inserted into the casing 10 so that it abuts against the inner side of casing 10. The length of the sleeve 11 is smaller than that of casing 10. The sleeve 11 can be made of a tube material available on the market and be, for example provided with an elongated slot 11a for facilitating its insertion. Sleeve 11 serves as a spacer for the parts positioned in the interior of the valve housing. One of such parts is a cover 12 which is supported at its edge against the end of sleeve 11. A guiding member 13 is supported against the opposite end of the sleeve 11. A flange-shaped portion 14A of a valve body 14 abuts against the end face of the guiding member 13.

A spool 15 and an armature 16 which smoothly slides in a spool recess, are positioned in the interior of the housing of the valve. All aforedescribed parts are secured to both ends of the casing 10 by flanging. One end of the external casing 10 is flanged already before assembly so that the assembly of the valve is substantially facilitated. This flanged end also serves as a stop or abutment.

The armature 16 is formed with a central bore in which a plunger 18 is rigidly mounted, which plunger extends through an elongated bore 19 formed in the guiding member 13 with a small play. Plunger 18 acts on a ball-shaped valve element 20 which is positioned in a valve chamber 21 of the valve body 14. Two valve seats 22 and 23 are formed in the valve chamber 21, which serve as an inlet opening and an outlet opening, respectively. The function of the valve is widely known and is not therefore described herein.

Figure 2:
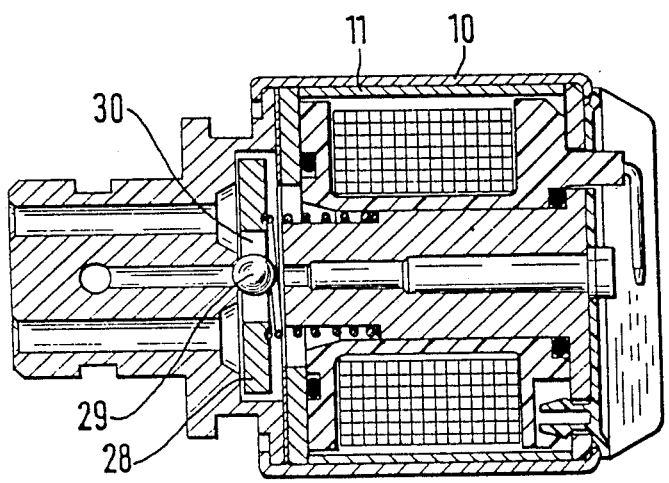
FIG. 2 is an axial sectional view of the electromagnetic valve of the second embodiment.

The valve of the embodiment depicted in FIG. 2 differs from that of FIG. 1 in that the armature is formed as a plate 28 while the ball-shaped valve element 29 is arranged in a respective slot-shaped recess 30. The structure of the housing with the external casing 10 and sleeve 11 is the same as that of FIG. 1.

Figure 3:
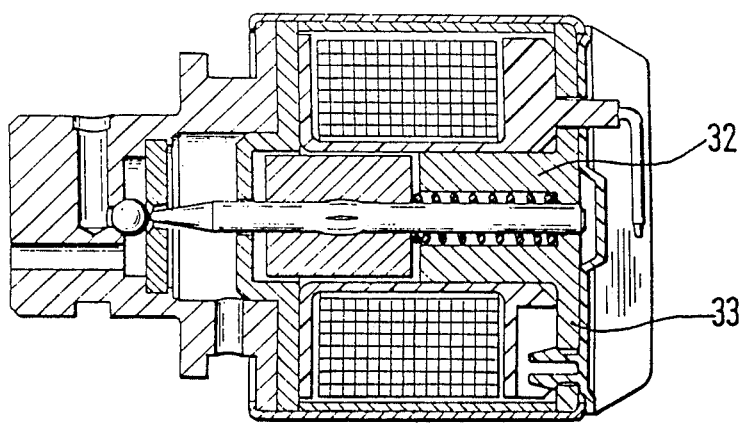
FIG. 3 is an axial sectional view of the electromagnetic valve of the third embodiment.

The embodiment of the valve shown in FIG. 3 distinguishes from the embodiment of FIG. 1 in that the armature 16 and the guiding member 32 are reversed in position. The guiding member 32 has an end flange 33 which executes the function of cover 12 of the embodiment of FIG. 1.

All the aforedescribed embodiments are known in principle. The inventive improvement in all of them resides in the structure of the housing which is made of two parts, namely external casing 10 and internal sleeve 11.

Figure 4:
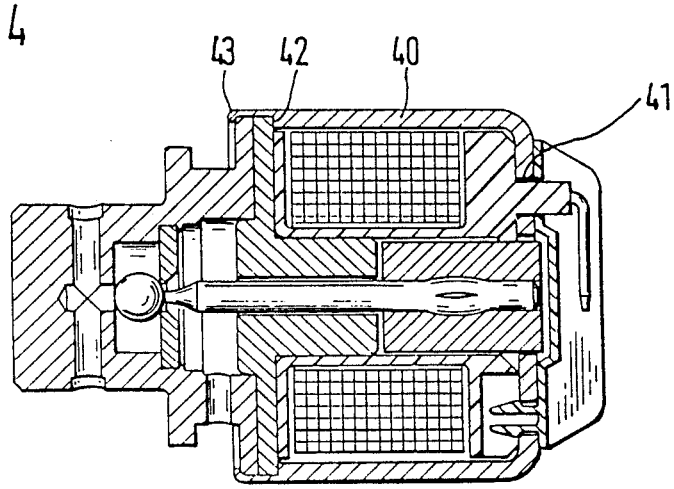
FIG. 4 is an axial sectional view of the fourth embodiment of the electromagnetic valve.
Figure 5:
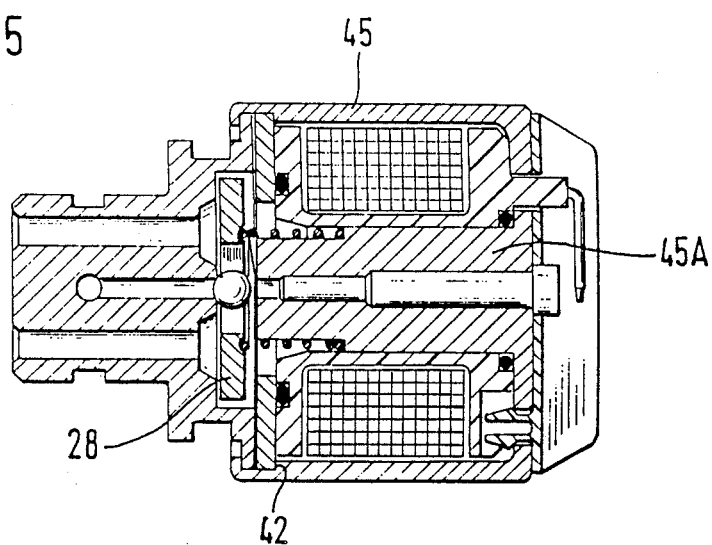
FIG. 5 is an axial sectional view of the fifth embodiment of the electromagnetic valve.
Figure 6:
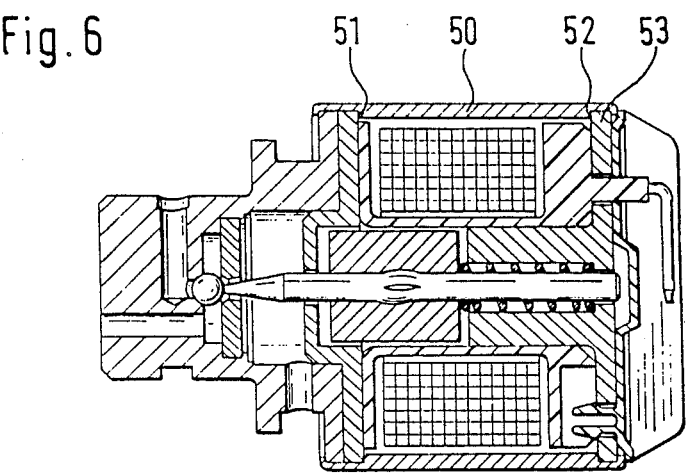
FIG. 6 is an axial sectional view of the sixth embodiment of the electromagnetic valve of the invention.
Figure 7:
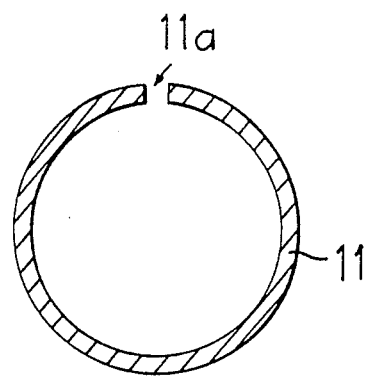
FIG. 7 is a cross-sectional view of a spacing sleeve according to the invention.

The specific characteristics of the embodiments of FIGS. 4 to 6 concern modifications in the valve housing.

In the embodiment of FIG. 4 the housing denoted by reference numeral 40 is formed as a cup-shaped part which can be manufactured, for example by deep drawing. At the same time, a bore 41 is stamped out in the housing 40, through which bore a cable is inserted, which leads to the spool. Near the open end of the housing 40, is formed a shoulder 42, on which the flanges of the guiding member 32 and the valve body 14 are supported. The rim 43 of the housing 40 is flanges inwardly and thus rigidly holds all the parts together.

The embodiment of the valve of FIG. 5 includes a housing 45 which is cup-shaped but formed here by extrusion molding. In addition, the housing has a central cylindrical portion or extension 45A which is also formed by extrusion molding. The spool 15 surrounds cylindrical portion 45A. In the valve of FIG. 5 similarly to the magnetic valve of FIG. 2, the armature is formed by the plate 28. The connection of the internal parts to each other in the housing is carried out by flanging of the external rim of the housing 45.

In the embodiment of FIG. 6, the valve housing 50 is formed similarly to that of FIGS. 1 to 3, as a tubular external casing. This casing 50, however, has near both ends thereof respective shoulders 51 and 52 on which the cover and the flange of the valve body plus the supporting plate 53 are supported. The connection of the internal parts of the electromagnetic valve in this embodiment is executed by flanging of two ends of the external casing 50 which for this purpose is made of tubular piece.

It will be understood that each of the elements described above, or two or more together, may also find a useful application in other types of electromagnetic valves differing from the types described above.

While the invention has been illustrated and described as embodied in an electromagnetic valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. An electromagnet valve, comprising valve means including a valve body; armature means for controlling operation of said valve means; a cylindrical tubular casing for enclosing a portion of said valve body and said armature means; guide means for said armature means; cover means, said cylindrical tubular casing being attached to said cover means and said cylindrical casing having two opposite flanged ends encompassing said guide means and said cover means of said electromagnetic valve, retaining parts of said electreomagnetic valve therein, and having a straight inner cylindrical surface extending between said two opposite flanged ends and defining a chamber in which said portion of said valve body, said armature means, said guide means, and said cover means are located; and a separate straight tubular cylindrical sleeve arranged in said chamber in a non-contacting relationship with regard to an armature for maintaining a predetermined spacing between said guide means and said cover means in said chamber.

2. An electromagnetic valve as defined in claim 1 wherein said sleeve has an elongate slot for imparting resilience to said sleeve.

* * * * *